April 21, 1964 E. P. G. WRIGHT ETAL 3,130,300
MEANS FOR RECORDING AND MODIFYING INTELLIGENCE
Filed March 18, 1954 8 Sheets-Sheet 4
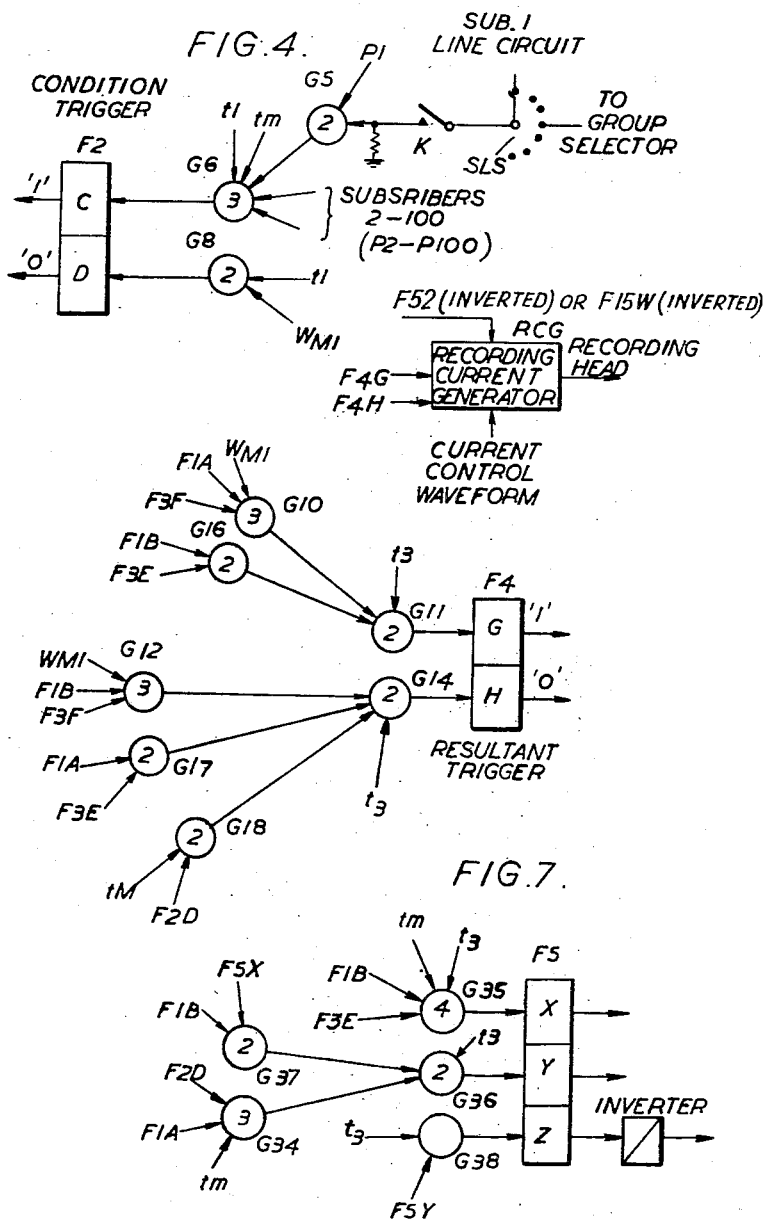
Inventors
E.P.G. WRIGHT· J. RICE·
D.G.N. HUNTER
By Robert Hardesty Jr.
Attorney

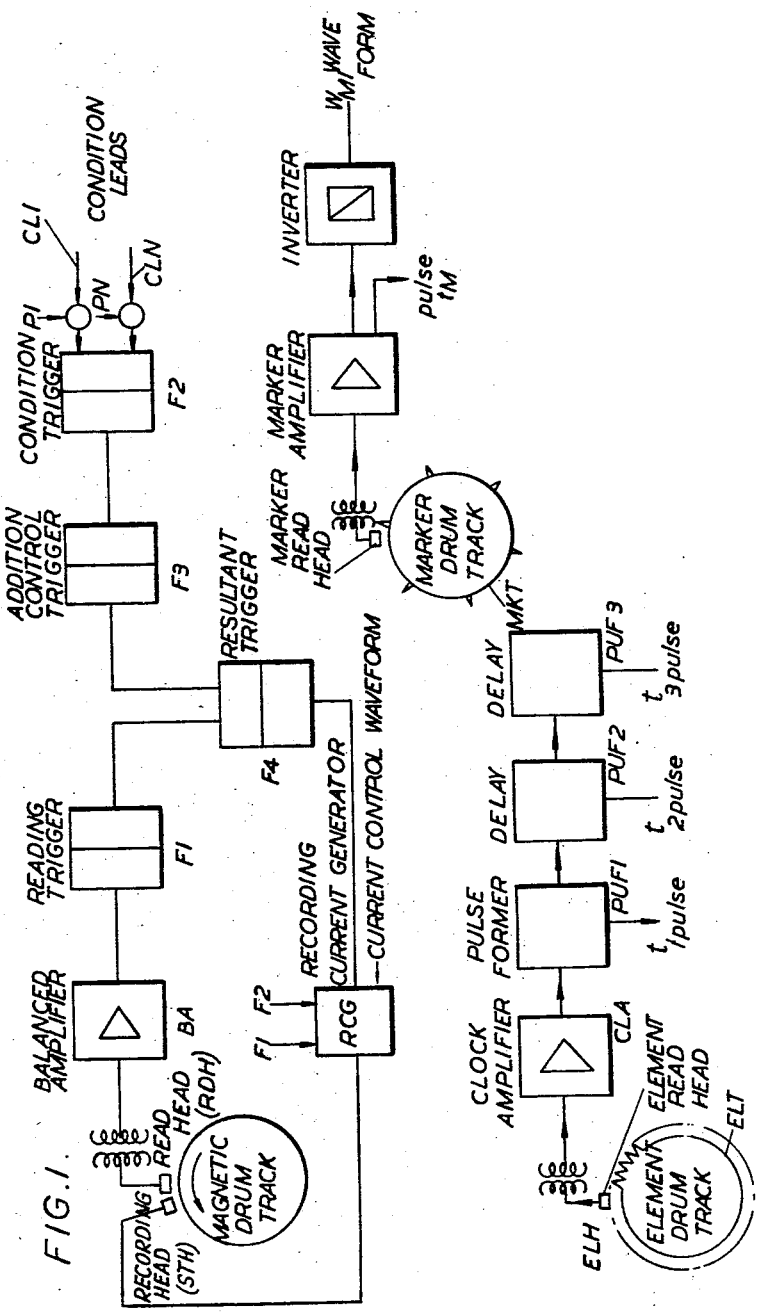

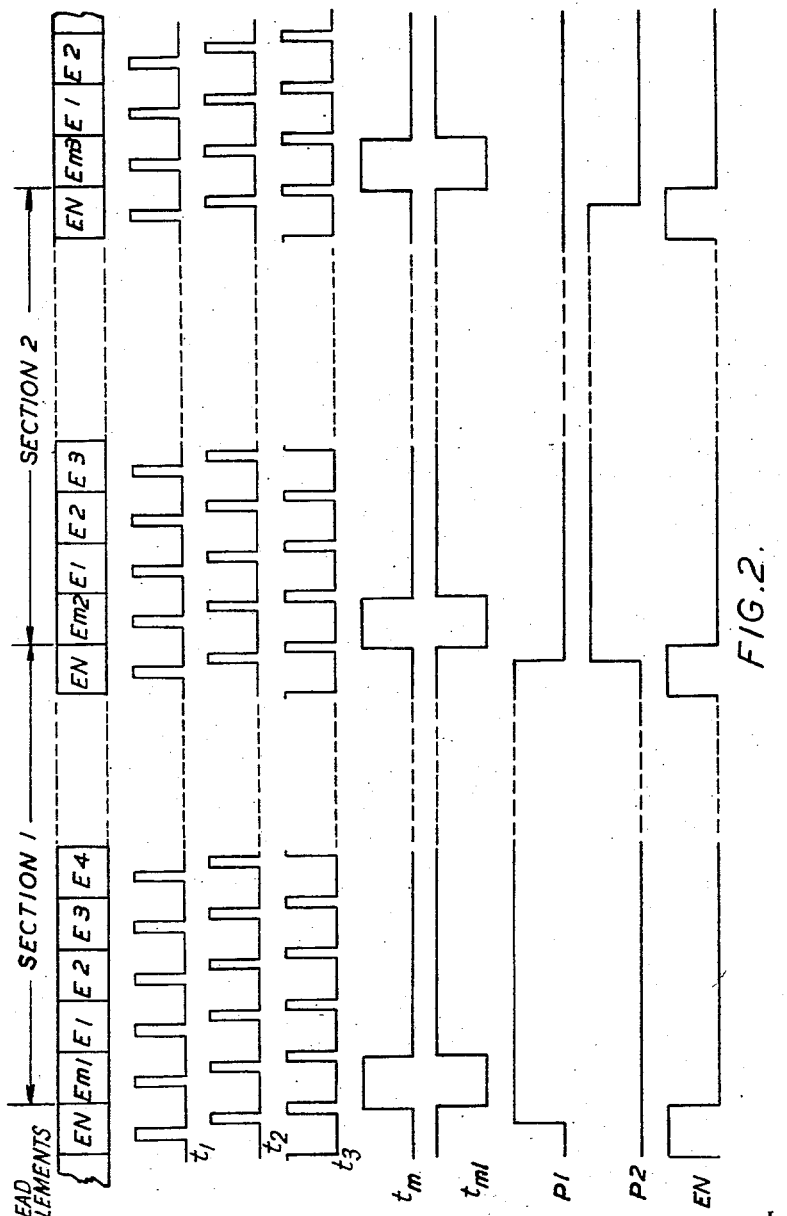

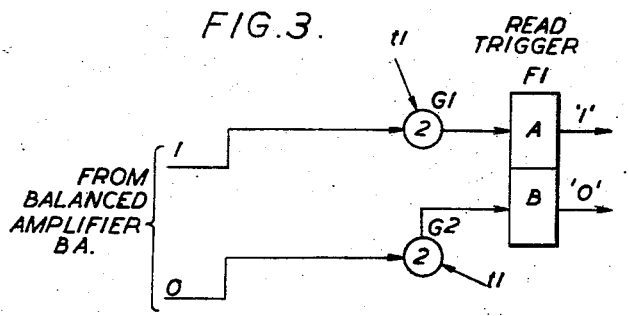
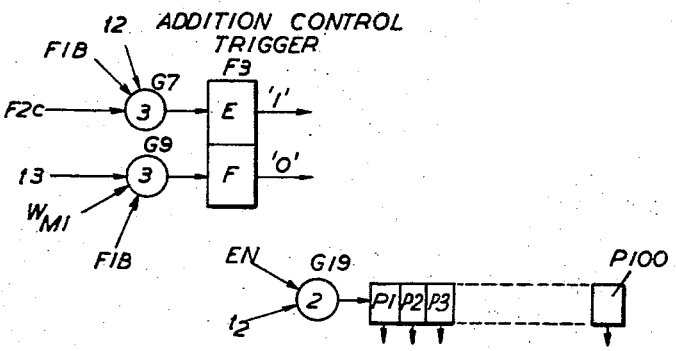
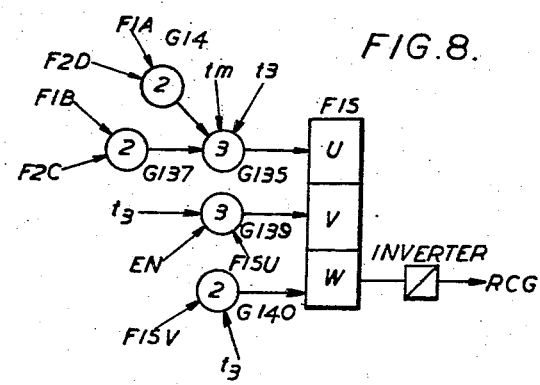

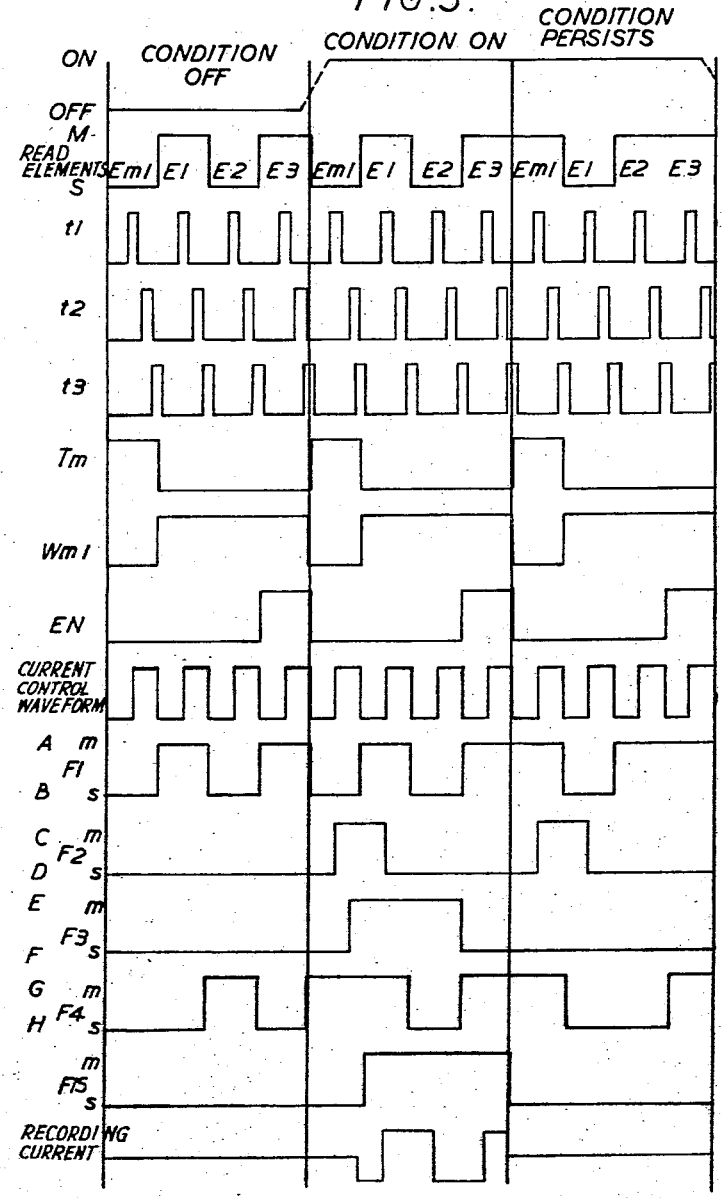

April 21, 1964   E. P. G. WRIGHT ETAL   3,130,300
MEANS FOR RECORDING AND MODIFYING INTELLIGENCE
Filed March 18, 1954   8 Sheets-Sheet 7
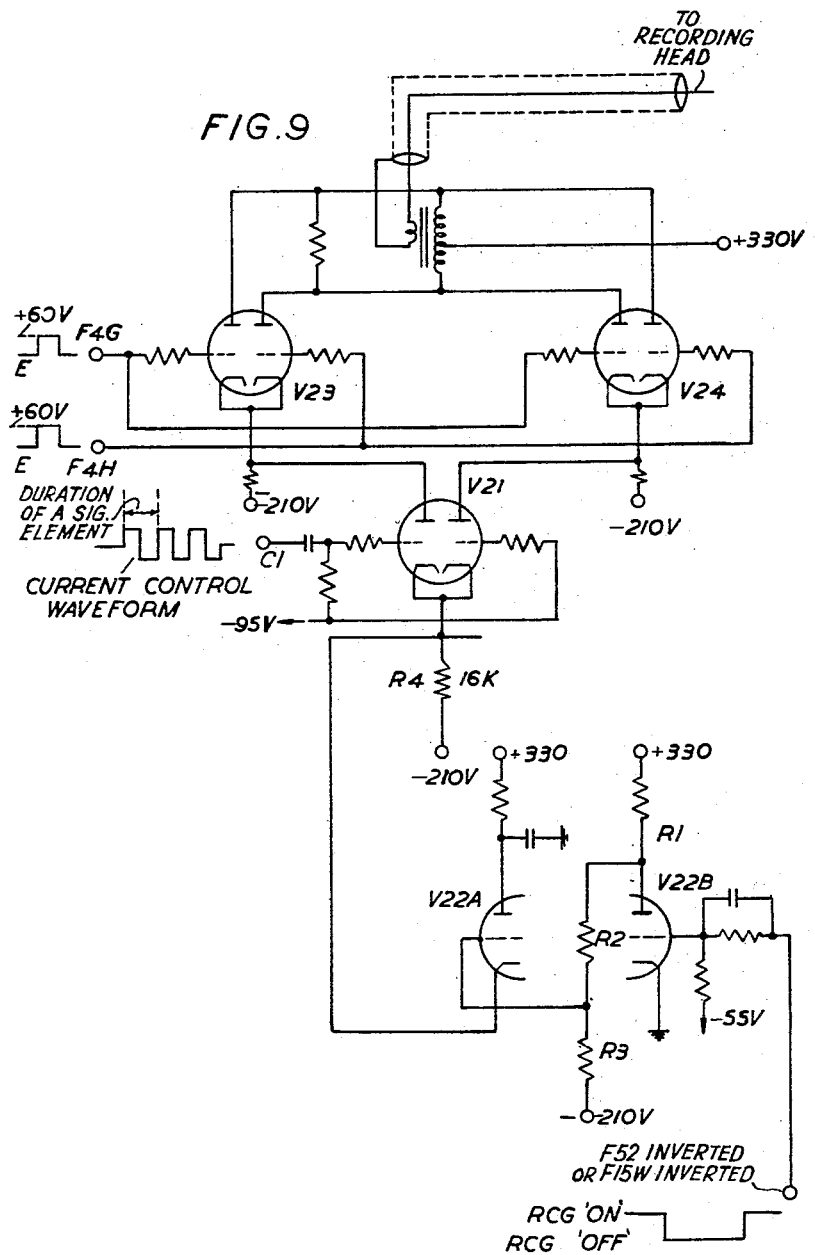
Inventors
E. P. G. WRIGHT - J. RICE -
D.G.N. HUNTER
Attorney

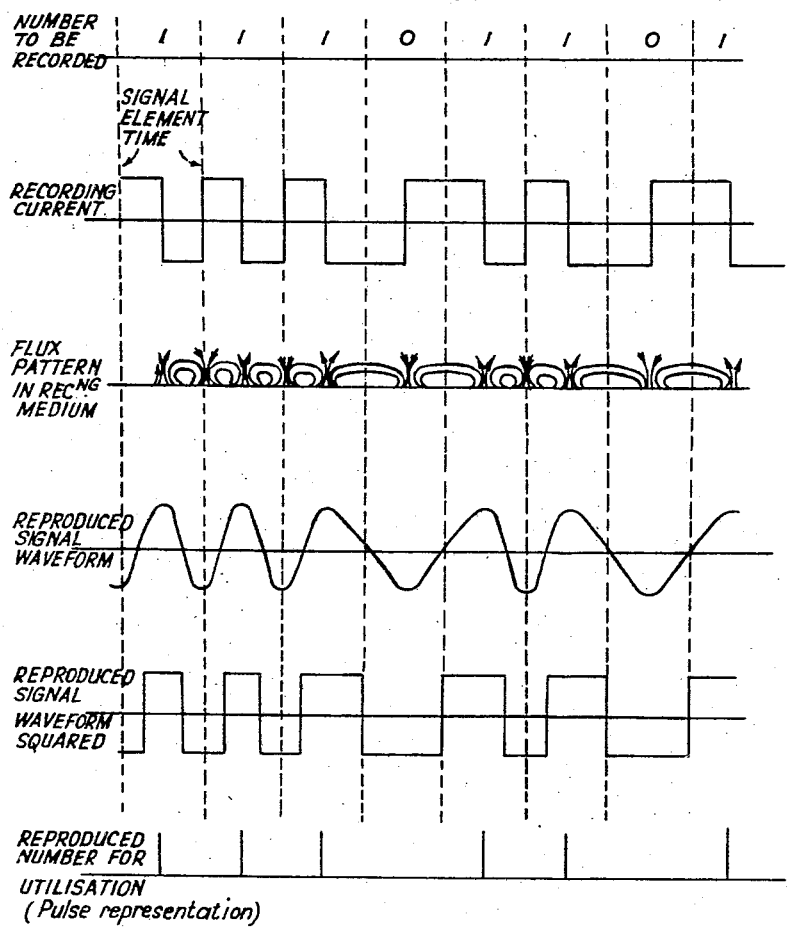

United States Patent Office 3,130,300
Patented Apr. 21, 1964

3,130,300
MEANS FOR RECORDING AND MODIFYING INTELLIGENCE
Esmond Philip Goodwin Wright, Joseph Rice, and Donald Gordon Neal Hunter, London, England, assignors to International Standard Electric Corporation, New York, N.Y.
Filed Mar. 18, 1954, Ser. No. 417,071
Claims priority, application Great Britain Mar. 25, 1953
4 Claims. (Cl. 235—167)

This invention relates to storage of intelligence.

The object of the invention is to provide improved means for modifying intelligence stored in the form of a series of elements in a medium capable of sustained storage without external stimulus, such as magnetic line recorders, e.g. tape or drum.

According to the present invention there is provided equipment for the storage of intelligence in the form of elements each stored in a defined elemental store, which includes means for recording intelligence element by element in said elemental stores, means for reading intelligence element by element, and means for modifying the stored intelligence by re-recording in changed form in the same elemental stores only those elements requiring change while the other elements remain in their stores unaffected.

According to the present invention there is further provided equipment for the storage of intelligence in the form of groups of elements each element of a group being stored in a defined elemental store, which includes means for recording a plurality of groups one after another and element by element, means for reading groups one after another and element by element, and means for modifying the intelligence stored in a group by re-recording in the same elemental stores all the elements in that group and by changing at least one element in said group while the elements in the other groups are not re-recorded but remain in their stores unaffected.

One embodiment of the invention will now be described with reference to the accompanying drawings in which:

FIG. 1 shows a general schematic of one embodiment of the present invention; each record cycle comprises a start element EM1, which is used to record whether an existing external signal has been dealt with; a series of intelligence recording elements; an end element EN used to give a period in which the recording current can be turned on and off.

FIG. 2 represents in timed relationship the waveforms encountered in the arrangement of FIG. 1.

FIGS. 3 and 4 show a circuit arrangement for effecting a desired modification to store intelligence.

FIGS. 5 and 6 show the waveforms encountered in the circuit of FIGS. 3 and 4.

FIG. 7 shows a trigger F5 for switching on and off the recording current generator.

FIG. 8 shows a modified form of F5 which is used when overprinting all elements in a group requiring modification.

FIGS. 9 and 10 show respectively the recording current generator and the waveforms involved in the recording current generation.

Figure 6:
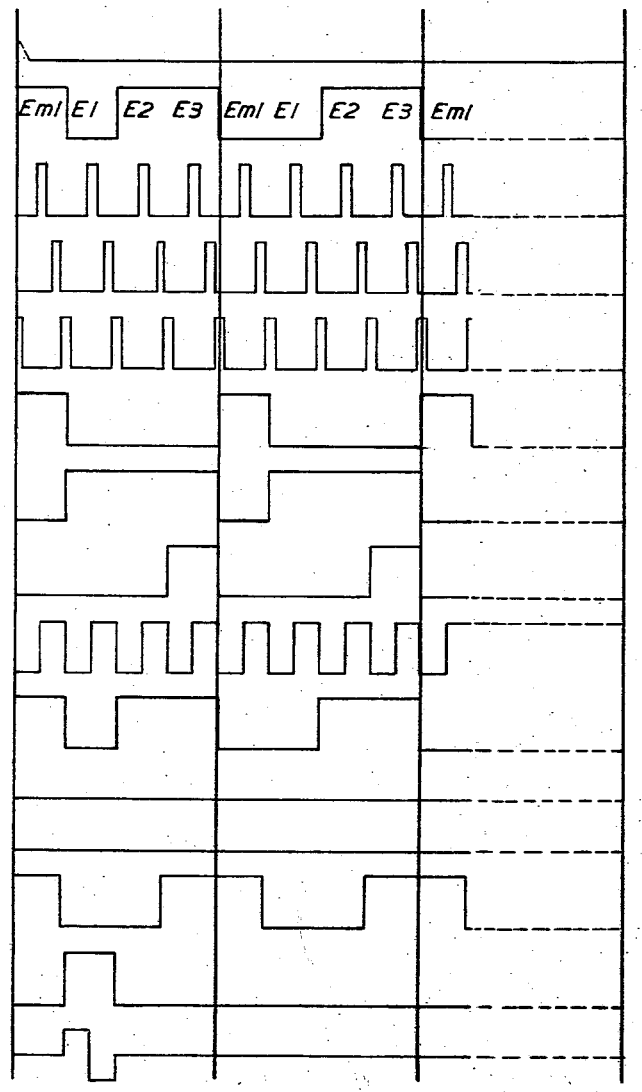

In application, Serial No. 289,383, filed May 22, 1952, now Patent No. 2,838,745, the use of a magnetic memory device for storage of information has been described. In the storage equipment to be described with reference to the accompanying drawings no duplication is necessary, as in the above specification since the recording and reading heads are so spaced relative to the speed of rotation of the drum and the time period between reading and re-recording that re-recording takes place on the same track elemental store from which the element was read.

Our invention is also applicable to the type of storage equipment in which a single head having one coil is used for both reading and recording. In an equipment of this type reading takes place on the leading edge of a stored element. The read element is passed to a modifying circuit where it is changed and passed back to the head for re-recording. The complete operation of reading, modifying and re-recording takes place in the time taken for the elemental store in which the element is stored to position itself centrally of the head so that the changed element can be stored in the same elemental store from which it was read.

In the equipment to be described a reading and recording head are mounted substantially the length of one elemental store apart and adjacent a track on a revolving magnetic drum upon which the information is stored. Each element read by the reading head is examined by a modifying circuit and, if the conditions are such that the element is to be changed, a changed element is passed to the recording head for re-recording. The reading, modifying and re-recording take place in the time taken for the elemental store to pass between the reading and recording heads so that the changed element is overprinted on the read element and is stored in the same elemental store from which it was read. If the conditions are such that the read element is not to be changed, then no recording current is passed to the recording head and the element remains in its store unaffected.

It will be realised of course that the reading and recording heads may be mounted further apart than the length of one elemental store provided the delay between reading and re-recording is appropriately increased.

Previously, recording was continuous in the sense that for a large fraction of the time information was being recopied again and again on itself; the recording current can now be turned off except when modification of the record is necessary, thus greatly reducing the possibility of random errors being introduced into the store, and making the design of equipment easier to safeguard the information in the event of power supply failure.

The arrangement described shows the phase modulation type of recording although it will be understood that other known forms of recording, e.g. telegraph type, can be used.

FIG. 1 is purely schematic, and all the different electronic circuit tools are indicated by rectangles with a schematic-indication in some cases of their purpose. For instance, a trigger circuit is two rectangles side-by-side, and so on. One storage track of the magnetic drum is shown as a circle with reading and storage heads RDH, STH. The single section-marker track of the drum with its spaced teeth is shown at MKT, and the element track with one tooth per element position at ELT. Electronic gates are indicated by small circles with a plurality of incoming leads and an outgoing lead.

FIGS. 3 and 4 are more detailed circuits, but here the circuits of some well-known electronic circuit tools have been indicated by illustrative symbols instead of the complete detailed circuits. Thus a bi-stable trigger device is shown as a double rectangle, with two control leads and two outputs, while a counting train consists of a number of side-by-side rectangles representing stages, with an input at one end, and an output at each stage. Most of the triggers shown are controlled by rectifier gates of well-known type of which examples are shown in Proceedings of the Institute of Radio Engineers, May 1950, in an article on "Diode Coincidence and Mixing Circuits in Digital Computers," by Tung Chang Chen. These gates comprise a circle with inputs and an output and an interior figure indicating the number of inputs on which coincidence is required for the gate to open. The interior figure of a gate may be equal to or less than the number of inputs, and is shown as being controlled by time-position pulses derived from the marker tracks and by the various trigger circuits: again, the exact way in which a tube applies a potential to a gate is not shown as this is commonplace in the art. Thus, considering trigger F2 (FIG. 4), its upper control lead is connected to two different gates: one, G6, is controlled from a number of gates G5, by time pulse $t_1$ which occurs in every track element position, and by time pulse $t_m$ which occurs once per cycle. The number inside the circle representing the gate, namely, 3, indicates that three coincident conditions are necessary to open the gate. A second gate G5 is controlled by time pulses P1 which occur once per cycle and by a control lead from a telephone subscriber's line circuit.

The invention is applicable among other things to telecommunication systems, computer systems, transport and theatre booking systems.

Each embodiment will comprise a storage medium with storing and reading heads and means intermediate said heads for modifying information passing from the reading head to the storing head. The modification can be by way of addition, subtraction or other mathematical operation.

The device to be used for storing a plurality of items of information is a rotating magnetic drum. On the surface of the drum are a number of parallel tracks, the tracks going round the periphery of the drum. The number of tracks on the drum is dependent upon the storage requirements. Each track has a read head and a storage head, the two heads being connected together via electronic control equipment.

A track may be considered as composed of a number of element positions. In practice it is possible to have up to 150 elements per inch round the periphery. For example, a drum of 2 inches diameter, i.e. approximately 6 inches circumference, may have 900 elements per track and, if the maximum value to be stored for the individual items of information requires 20 elements arranged in binary form, the track may be used for storing 45 independent items. For additional independent items the number of tracks would be increased accordingly and separate heads and control equipment added.

Consider another example in which the maximum item to be stored is the number, 10,000, and the number of individual items is to be 1,000. Using a binary method of storage, 10,000 may be represented by using 14 binary elements. If it is desired to have 100 items per track, the required elements per track will be 1,400 and, using a packing of 100 elements per inch of periphery, the circumference of the drum would be 14 inches (approximately 4½ inches diameter). Ten such tracks would be required and if the tracks have a separation of ½ inch between centre, the axial length of the drum would be approximately 6 inches. Each track would have its own read and record heads and control equipment.

The read head RDH reads the elements passing underneath it in turn and, if they require modification, passes them to a device which performs the change. The modified elements are then transferred to the store head STH and overprint the original elements. If any of the read elements do not require modification, however, then the store head is isolated from these elements during their passage under it. Thus it will be seen that in any particular group of elements only those elements which require to be modified are transferred (after modification) to the store head to overprint the element with the new value.

FIG. 1 is a schematic drawing showing the equipment required for one track on the magnetic drum. A marker track MKT, common to all the storage tracks, is provided on the drum to give the starting positions for the various storage sections. This track has permanently magnetised element positions coinciding with the first elements of the storage sections on the storage tracks. Such elements may be provided by making toothlike projections on the periphery of the marker track and then magnetising the track. The heads are mounted so that they are just clear of the drum.

The output $t_M$ from the marker read head MRH is used to provide pulses to operate a position counter PC (FIG. 3) which has one position for each storage section on the counter track. The outputs P1 . . . PN (for instance, P1 . . . P100) from the position counter PC are used to scan in turn the input leads CL1 . . . CLN to the condition trigger F2. The control circuit used will depend upon the particular application for which the equipment is to be used. It may be required, for instance, to add 1 to a value read by the read head whenever a condition signal appears on the relative control lead e.g. CL1, or to pass on the previous value if the condition signal is absent. Alternatively, it might be required to add or subtract any required figure signalled via the input leads. In this case the control circuit would be similar to the converter arrangement described in application Serial No. 450,185, filed August 16, 1954, now Patent No. 2,831,179.

The rotational speed of the drum must be such that all condition leads CL1 . . . N are scanned in the time of the shortest conditional control on the said leads. For example, in a telephone exchange subscriber metering application a metering condition appears on the subscriber's P-wire for not less than 250 milliseconds. Thus all the independent values on one track must be scanned in not more than 250 milliseconds.

FIG. 1 shows by way of example, an addition trigger F3 controlled by the condition trigger F2. A resultant trigger F4 is controlled by the reading and addition triggers F1 and F3. The output from F4 passes to a recording current generator which is so controlled by the triggers F1 and F2 that elements to be changed are changed and passed to the recording head to overprint the element stored, and those elements not to be changed are prevented from being presented to the recording head.

In general the control signals on the condition leads CL1 . . . N will not be synchronised to the rotation of the drum and so a means must be provided to prevent more than one modification being made to a stored item during one application of the control. This is accomplished by using one extra element position per storage section of the track and using this element to provide the information that a modification has been made and no further modification is to be made until the control is removed and a new control appears.

An extra track, the element ELT, is provided as a means of supplying the various pulse supplies for the control circuit, this track is common to all the counting tracks on the drum. Round the periphery of this track are permanently magnetised toothlike projections, there being one projection for each element position. The output from the element read head ELH passes to a clock amplifier CLA and a pulse former PUF1 to provide $t_1$ pulses which pass to the pulse output and to the delay PUF2 to produce $t_2$ pulses which are also passed to the output and to a second delay PUF3 to produce pulses $t_3$. The pulse $t_1$ is arranged to occur in the middle of a read element and lines up (in time) with the positively-going edge of the current control waveform (FIGS. 5 and 6). $t_3$ is made to line up with the negatively-going edge of the current control waveform. The pulse $t_2$ occurs between $t_1$ and $t_3$.

FIG. 2 shows the pulse and waveform relationship for two storage sections of a drum.

The marker track, as previously described, supplies a pulse $t_m$ coincident with the first element of each storage section and also an inverted waveform $\bar{t}_m$, namely $W_{MI}$, for use in the control circuit. Pulse $t_M$ is also used to step the position counter PC which, therefore, will make one step at the beginning of each storage section.

The output from the read head passes to a balanced amplifier BA and so to a reading trigger circuit F1. The latter will take up one position for one direction of magetisation of an element and the other position for the reverse magnetisation. The reading trigger will give element by element the existing item on the drum. The condition leads CL1 . . . CLN are examined in turn, the particular one being examined being determined by the output of the position counter PC, as indicated by the gates controlled by the leads marked $P_1$, PN, and by the condition leads CL1, CLN. The condition trigger F2 will be operated accordingly. If the lead under examination shows no signal the trigger will be set to one position and if a signal is found on the condition lead the trigger will be set to the other position. The output of the condition trigger is used to control an additional control trigger F3. The latter is so arranged that the first time a control condition for a particular recording is found on the corresponding condition lead CL1 . . . N it will be set to one position, but thereafter it passes out of control of the condition trigger F2 until the condition on the associated lead disappears. This is accomplished by using the output from the elements $Em1$ which is used to record whether or not an addition has been made for a received signal on the condition lead. The operation is given in more detail in connection with FIGS. 3 and 4.

The addition control and reading triggers F3, F1 together control the resultant trigger F4. The arrangement is such that when no addition or subtraction has to be made the resultant trigger is set according to the output from the reading trigger. However, when a modification has to be made the resultant trigger will be set according to the outputs of both the reading and addition control triggers. It should be understood that it is possible to make use of complementary values so that subtraction becomes simply an addition process.

The output from the resultant trigger F4 is passed to the recording current generator RCG. This generator is so arranged in conjunction with the reading trigger F1 and the condition trigger F2 that recording current is only passed to the recording head STH when the elements stored have to be modified. When no modification of the store is required, then no current flows through the head STH and the signal elements already stored remain unaltered in elemental store.

In FIG. 2 the element positions $Em1$, $Em2$ and $Em3$ are the elements used to denote in respect of storage sections 1, 2 and 3 that an operation has been carried out for a corresponding control signal still on the condition lead. Further, the long pulses P1, P2, indicate the duration of successive cycles of position counter PC, each P pulse covering the period from time $t_2$ of the last digit in the previous section, $E_m1$, E1 . . . to time $t_2$ of the last digit in the present section. FIGS. 5 and 6, which should be placed side by side, illustrate the waveforms before, during, and after a signal has appeared on a condition lead CL1. It will be seen that when $Em1$ is positive it indicates that the section of the track associated with $P_1$ has had a modification performed on it and no further modification will be permitted until $Em1$ has been removed. This removal will be effected the first time a scan is made and it is found that the condition signal on the corresponding condition lead CL1 has been removed. $Em2$ (FIG. 2) being zero shows that suitable modification can be made on the second section of the track when the control condition appears on the pertinent condition lead CL2.

A series of elements denoting a binary number appear with the element of least significance first, E1, E2 . . . EN.

For the purposes of the following description each subscriber is assumed to be provided with only three binary elements for registering purposes although in practice more would usually be required. A further element $Em1$ is provided at the beginning of each store and is used to record that an existing metering signal has already been acted on.

The description will be given in two sections:
(1) When no metering is taking place.
(2) When metering is taking place.

The conditions for subscriber 1 only will be considered, the operation being the same for all other subscribers although taking place in a different time allocation.

(1) NO METERING

The counter PC is synchronised as previously described with the flow of the information from the memory, such that when section 1, allocated to subscriber 1, is passing the reading device, PC will have P1 energised and so on for other sections.

Gates G1 and G2 (FIG. 3) allow information via leads 1, 0 from the memory reading device to pass to the reading trigger F1 at time $t_1$. If mark element '1' is present F1A will conduct and if an element is a space element '0' F1B will conduct.

Since no metering is taking place for subscriber 1 there will be no metering signal via the subscriber's line switch SLS (FIG. 4) and cut-off relay contact K. Gate G5 will remain closed even when P1 is energised and tube D of condition trigger F2 will remain conducting. Similarly tube F of the trigger F3 will remain conducting. Thus of the gates associated with resultant trigger F4 (FIG. 4) it is possible for gates G10, G11, G12 and G14 to open with the requisite condition of reading trigger F1, together with G18 for the duration of the element $Em1$.

Since no metering is taking place when $Em1$ passes the reading device, G18 is opened for time $t_M$ and at time $t_3$ of $t_M$, G14 will open and cause valve H of the trigger F4 to conduct, if not already conducting. Thus the storage device will cause a space metering element, $Em1$, to be passed to the recording current generator RCG.

As the elements of section 1 pass the reading device, waveform $W_{MT}$ and tube F3F prepare gates G10 and G12 and these gates will open according to the setting trigger F1. If F1A is operated the three conditions for opening gate G10 are coincident and at time $t_3$ G11 operates. If F1B is operated with F3F, gate G12 opens, and at time $t_3$ opens gate G14 to operate F4H. F4 will be set according to F1 such that F4G will conduct for F1A conducting and F4H will conduct for F1B conducting, that is, the information from the reading device will pass without modification to the recording current generator.

As the last element of section 1 passes the reading device, a pulse EN, coincident with the last element, is applied to G19 (FIG. 3) so that at time $t_2$ a pulse is passed via gate G19 and counter PC steps to P2 in readiness for dealing with subscriber 2.

Overprinting of the existing record is controlled by trigger F5 (FIG. 7) and by the recording current generator RCG (FIG. 4). The trigger F5 has three stable conditions X, Y and Z, but only one of these can be conductive at one time. F5 is controlled by three sets of gates and its output is taken from tube Z and applied to RCG via an inverter. Thus, when Z is conducting RCG is switched off and when either X or Y are conducting RCG is switched on.

A more detailed description of F5 and its associated gates will be given later but the arrangement is such that F5Z will have been made conducting by the previous section and RCG consequently switched off before $Em1$ is received.

In the case we are considering, that is when there is no metering signal, the element $Em1$ is a '0' signal. At time $t_1$ of $t_m$ the trigger F1 has its B valve energised and the trigger F2 its D valve energised. This means that neither gate G35 nor gate G37 can open so that F5Z remains energised and the recording current generator is switched off. Thus none of the signals presented to RCG by F4 results in recording signals being passed to the recording head.

By means of F5 and RCG, recording or overprinting is limited to those periods when a change in the content of a store is required, and repeated reading and re-recording of an unchanged store content is avoided.

(2) WITH METERING

When metering takes place a positive potential is applied on the metering wire from the switching circuit and received on the wiper of the subscriber's uniselector SLS. At this time the cut-off contact K will be closed so that a positive potential is applied to gate G5. When the section allocated to subscriber 1 is to be read stage P1 of position counter PC is energised and gate G5 will open. In consequence at time $t_1$, $t_M$ gate G6 will open and tube C of F2 will be energised. Since no previous addition has been made for this metering signal, tube B of F1 will be conducting, because $Em1$ will be registering '0.' At time $t_2$ of $t_M$ G7 will open, and tube E of addition control trigger F3 will be caused to conduct. Also at the time $t_3$, $t_m$, G35 will open and cause F5X to energise. F5Z is triggered off and a potential applied to RCG such that the recording current generator RCG is switched on; thus elements are recorded in accordance with the condition of F4.

The intention now is to add '1' to the number taken from the reading device and pass the modified reading to the recording current generator which will change the element recorded on the storage device. Also, since this modification is to be made, it is necessary to change the element $Em1$ to a '1' so that no further additions will be made for the same metering signal. Since the metering condition is present and $Em1$ is a space element, both tubes B of F1 and E of F3 will be conducting as the element $Em1$ passes the reading device and gate G16 will be opened. Thus at time $t_3$ of $t_M$ G11 will open and tube G of F4 will be caused to conduct and a marking element will pass to the recording current generator. Since RCG is already prepared a mark signal will be produced by RCG and passed to the recording head to modify the element $Em1$ to a mark. At time $t_1$, $W_{M1}$, that is the first $t_1$ pulse in the number storage proper, G8 will open and tube D of F2 will again be caused to conduct.

Now it is necessary to read and modify the digit elements. To add '1' to a binary number, starting at the least significant element it is necessary to reverse all elements up to and including the first zero. As before it will be assumed that before metering takes place the stored number for subscriber 1 is 101, i.e. 5 and it is necessary to add '1' to make 110, i.e. 6. Taking the least significant element first, the number 5 is stored as Mark, Space, Mark, on the drum by longitudinal magnetisation of reverse polarities. (The elements are illustrated in FIGS. 5 and 6.)

When the first and least significant digit element E1 is read, tube A of F1 will conduct. Since at this time tube E of F3 is conducting and $W_{M1}$ is positive, the gates associated with F4 which have to be considered are G16, G11, G17 and G14. For the first mark element, tube A of F1 is conducting, and at time $t_3$ G14 will open causing H to conduct. Thus although a '1' or mark was read, a '0' or space is passed to the recording current generator where a '0' is generated and passed to the recording head.

For the second element, which is a '0,' B of F1 will be conducting, thus opening G16, and consequently at time $t_3$ G11 will open and cause G of F4 to conduct, thus causing RCG to record a '1' or mark. The second element E2, being the first '0' in the binary number, is the last element that has to be changed. F1B operates in response to E2 and opens G37. At time $t_3$, G36 opens and causes F5Y to conduct. Gate 38 is prepared by F5Y and at $t_3$ of E3 opens to make F5Z conduct and so switch off RCG to prevent further recording. In connection with the operation of F5Z at $t_3$ of E3 it will be remembered that the store head is placed one element apart from the read head. Thus when E2 is being modified by the store head the read head is reading E3.

Also at time $t_3$, $W_{M1}$, with B of F1 conducting, G9 will open and tube F of F3 will again conduct. Thus for subsequent elements, F4 will be under control of G10 and G12; that is the elements will be passed to RCG as read. However, since RCG is switched off by F5Z, these elements will not initiate recording.

The new recording will be 110, 6, as required, and also $Em1$ will have been changed to a mark signal. Assuming that the metering condition is still present the next time section 1 is to be read, i.e. when P1 of counter PC is energised once again, G6 will open at time $t_1$, $t_M$, and tube C will conduct. However $Em1$ is now a mark signal, so that when the metering element is read, tube A of F1 will conduct so that this time G7 will not open at time $t_2$, and addition control trigger F3 will remain with F conducting. At time $t_1$ $W_{M1}$, G8 will again open and tube D of F2 will conduct once again. When the digital elements are being read, gates G10 and G12 will open according to the setting of F1 and trigger F4 will be set in accordance with F1. Since, however, F5Z is operated, RCG is switched off so that the setting of F4 does not result in any recording current being passed to the recording head. Although the metering condition may persist for several cycles of counter PC, it can be seen that no further recordings will be made.

It is assumed that the cycle time of PC is less than either the duration of a metering condition and also the minimum interval between metering conditions.

After the metering condition has disappeared and P1 is enegised once again, G5 will remain closed and tube D will remain conducting. With F1A and F2D operated, gate G34 is opened, and at time $t_3$ G36 opens to trigger F5Y and so turn on the recording current generator RCG and prepare G38 for operation. Also at time $t_M$, G18 will open and at time $t_3$, G14 will open, causing H of F4 to conduct and so cause a '0' to be recorded by RCG in the $Em1$ elemental store. At the next $t_3$ pulse, G38 operates and F5Z triggers to switch off the recording current generator and prevent succeeding elements being recorded. The recording can pass to the binary-decimal converter, as described for subscriber 1.

In an alternative form of equipment all the elements in a section or group to be modified are re-recorded while the elements of a section or group not requiring modification remain in their elemental stores unaffected. In a group to be modified, therefore, those elements that do not need changing are overprinted with the same character i.e. a mark or '1' element is overprinted with a mark or '1.'

These are two conditions when a group or section requires modification. One of these is when $Em1$ is a space and there is a metering condition on the subscriber's line; this indicates that the binary number is to be increased by one, and the other is when $Em1$ is a mark and the metering condition is removed from the subscriber's line; this indicates that $Em1$ is to be changed to a space in order to prepare the group for the next metering signal.

The only modification necessary to the equipment is to replace F5 (FIG. 7) and its controlling gates by F15 (FIG. 8) and its gates. When one of the conditions referred to above occurs, either G134 or G137 will open and at $t_3$, $t_m$, G135 will open to energise F15U and switch on RCG, and prepare G139. When the last element EN in the group is read, G139 opens at time $t_3$ to energise F15V and prepare G140 which opens at the next $t_3$ pulse to operate F15W and switch off the recording current generator RCG.

Other types of memory to which the invention can be applied are static magnetic matrices as described by J. A. Rajchman in R.C.A. review, June 1952, and ferro-electric memories, such as barium titanate crystals, as described by Anderson in Electrical Engineering, October 1952, pages 916–922. In these cases, it is essential to stop reading as well as recording between condition changes, since reading involves changing the recorded information: a recording scan would follow one element behind a reading scan of the individual storage elements.

*Circuit Operation of Recording Current Generator FIG. 9*

Tube V22 is the control tube which turns the circuit on and off and starts or stops the recording current.

V21, V23 and V24 work together to record either mark or space signals, when permitted to do so by V22.

The power supplied to the circuit is drawn from a source providing voltages between +330 v. and −210 v. in relation to earth. V22A—V22B is a double triode trigger circuit. The grid of V22B is at a potential which cuts off this side of the tube and V22A is biassed by potential divider R1, R2, R3 to a potential (about −60 v.) which allows this side of the tube to draw current. The result is that the cathode of V21 is raised in potential to about −70 volts to cut off V21 by virtue of the voltage drop in the cathode resistor R4 which is shared between V22 and V21. Hence no current flows in V21, V23 and V24 and so no current flows in the primary of the transformer in the anode circuit of V23 and V24, and no recording can take place, V23 being in series with the left-hand side of V21 and V24 being in series with the right-hand side of V21.

The recording switching-on waveform occurs when either F5Z inverted or F15W inverted is removed from the grid of V22B which causes this side of the tube to conduct and in consequence V22A is cut off by the anode-to-grid coupling through R2. Current can now flow in one side or other of V21 owing to the absence of the voltage drop in R4.

It is assumed that the known technique of "phase recording," is used, that is, for any one signal element there is a polarity change.

A current control waveform is provided which consists of square pulses of equal on/off duration, one complete on/off cycle being equal in duration to a signal element to be recorded. This waveform is applied through capacitor C1 to the left-hand grid of V21 and takes it to a potential of −85 volts in the "on" condition and −105 volts in the "off" condition. Normally both grids of V21 are biassed to −95 volts and the cathode resistor R4 is returned to the −210 volt terminal of the power supply.

The switching-on of RCG is timed to coincide with the leading edge of the positive going "on" half cycle of the current control waveform.

When the circuit is switched-on at the grid of V22B, the positive-going part of the current control waveform is simultaneously applied to C1, making the left-hand grid of V21 10 volts more positive than the right-hand grid. On cessation of current in V22A, the voltage drop in R4 tends to disappear, but it is replaced by the current drawn by V21 which stabilises the cathode voltage of V21 at about −84 volts, at which the right-hand side of V21 is cut off by about 11 volts negative bias.

When the current control waveform commences the "off" half cycle, the voltage of −105 volts on the left-hand grid of V21 cuts off this side of the valve and the cathode voltage falls negative till it approaches the grid bias voltage (−95 v.) of the right-hand grid, permitting the right-hand side of V21 to conduct.

Mark signals are applied by F4G to the left-hand grids of V23 and V24 whilst space signals are applied by F4H to the right-hand grids of these two valves. Each of these terminals is at earth potential in the rest condition and in the presence of a signal is carried to +60 volts.

The cathodes of V23 and V24 are at about +61 volts when conducting. They are connected through high resistances to the −210 volts H.T. tapping to stabilise the cathode voltages at a similar level when the circuit is inactive.

*Recording a "Mark" Signal*

When a "mark" signal is applied by F4G, the left-hand side of V23 conducts and the right-hand side cuts off. Current through the tube is as follows: +330 v., top section of output transformer primary, left-hand side of V23, left-hand side of V21, R4—210 v. Half way through the "mark" signal element, the current control waveform changes to the "off" condition and the left-hand side of V21 is cut off. The right-hand side of V21 now conducts and allows V24 to conduct. Again because of the "mark" signal, the left-hand side of V24 conducts and the right-hand side of V24 is cut off. Current flows from +330 v. through bottom section of transformer, left-hand side of V24, right-hand side of V21, R4, to −210 v., i.e. the current through the secondary of the transformer and in the recording head will be in the opposite direction to the first half of mark element.

*Recording of "Space" Signal*

During first part of the "space" signal element, the current control waveform is positive going and the left-hand side of V21 conducts. Because of the space signal applied by F4H the right-hand side of V23 conducts and current flows from +330 v., through bottom section of transformer primary, right-hand side of V23, left-hand side of V21, R4, to −210 v., that is, the current in the secondary of the transformer and in the recording head will be in the opposite direction to the first half-element of a "mark" signal but in the same direction as the second half of a mark signal.

Similarly when the current control waveform goes negative for the second half of space element, current flows from +330 v., through right-hand side of V24, right-hand side of V21, R4, to −210 v., i.e. via top half of transformer. Recording head current will therefore be the same as for first half of a "mark" signal.

The waveforms of the recorded and reproduced signals are shown in FIG. 10 which is self explanatory.

While the principles of the invention have been described above in connection with specific embodiments, and particular modifications thereof, it is to be clearly understood that this description is made only by way of example and not as a limitation on the scope of the invention.

What we claim is:

1. Equipment for the storage of intelligence in the form of groups of elements, the first element in each group being a supervisory element, comprising a store having groups of elemental sections, means for recording a plurality of elemental groups of intelligence one after another and element by element in corresponding elemental sections with the supervisory intelligence element being recorded in the first element of said store, means for reading groups of said sections one after another and section by section, said reading means and said recording means being so spaced relative to the speed of said store and said reading and recording means and the time period between reading and recording that re-recording takes place on the same track elemental store from which the element was read, means responsive only to an external signal for modifying the intelligence store in a group of elemental sections by causing said recording means to re-record in the same elemental sections certain of the elements in that group and to change at least one element in said group, means for causing said recording means to re-record said supervisory element in changed form and in the same elemental store section without affecting the remaining elements in the group, and means responsive to the coincidence of the external signal and a signal from the reading means when said reading means is reading said supervisory element for inhibiting the modifying means.

2. Equipment for the storage of intelligence comprising a store having successive elemental sections, intelligence recording means, intelligence reading means, means for operatively associating said recording means and said reading means repeatedly and successively with said elemental store sections, whereby intelligence may be recorded in said store sections or read from said store sections, an addition control trigger, a resultant trigger, first gating means responsive to an external signal for causing said addition control trigger to assume a predetermined condition when said reading means is reading intelligence from a predetermined one of said elements, second gating means for causing said resultant trigger to operate said intelligence recording means when said addition control trigger is in said predetermined condition to record intelligence in said predetermined one of said elemental sections and for causing said resultant trigger to record intelligence in a changed form in at least one other of said elemental sections when said reading means is reading intelligence from said other elemental section, and means responsive to said external signal and said reading means when said reading means is reading intelligence in a predetermined form from said predetermined one of said elemental sections for inhibiting the operation of said intelligence recording means.

3. Equipment for the storage of intelligence, as claimed in claim 2, in which the intelligence is stored in the form of groups of elements and is stored in groups of corresponding elemental sections, and in which the first and second gating means, the addition control trigger, and the inhibiting means cause the resultant trigger to operate the recording means for recording in changed form in the same elemental store sections only those elements within a group requiring change while the other elements of the group remain in their store sections unaffected.

4. Equipment, as claimed in claim 3, and in which the intelligence is in the form of a binary number, the first and second gating means, the addition control trigger, and the inhibiting means acting to cause the resultant trigger to modify the intelligence by adding one to the binary number, and to cause the recording means to re-record in changed form in the same elemental store sections all elements in the binary code up to an including the first zero, and to inhibit the operation of the recording means for the remaining elements of the code, so that these elements remain in their store sections unaffected.

References Cited in the file of this patent

UNITED STATES PATENTS

| | | |
|---|---|---|
| 2,540,654 | Cohen et al. | Feb. 6, 1951 |
| 2,614,169 | Cohen et al. | Oct. 14, 1952 |
| 2,700,148 | McGuigan et al. | Jan. 18, 1955 |
| 2,734,186 | Williams | Feb. 7, 1956 |
| 2,838,745 | Wright et al. | June 10, 1958 |
| 2,855,146 | Henning et al. | Oct. 7, 1958 |
| 2,899,500 | Bray et al. | Aug. 11, 1959 |
| 2,901,166 | Hamilton et al. | Aug. 26, 1959 |

OTHER REFERENCES

Electronic Engineering, "A Magnetic Digital Storage System," July 1949, pages 234–237.